United States Patent [19]
Monroe et al.

[11] Patent Number: 5,368,309
[45] Date of Patent: Nov. 29, 1994

[54] METHOD AND APPARATUS FOR A VIRTUAL VIDEO GAME

[75] Inventors: Marshall Monroe; David Fink, both of Glendale, Calif.

[73] Assignee: The Walt Disney Company, Burbank, Calif.

[21] Appl. No.: 62,304

[22] Filed: May 14, 1993

[51] Int. Cl.⁵ .............................................. A63F 9/22
[52] U.S. Cl. ................................. 273/437; 273/434; 273/DIG. 28; 345/7; 345/9; 353/30; 359/630
[58] Field of Search ........ 273/433, 434, 437, DIG. 28, 273/310, 312, 313, 316, 85 G; 345/1, 4, 7, 8, 9, 37, 38, 87; 353/28, 30, 37; 359/471, 472, 477, 630, 629

[56] References Cited

U.S. PATENT DOCUMENTS

| | | | |
|---|---|---|---|
| 4,084,194 | 4/1978 | Hector | 273/DIG. 28 |
| 4,189,145 | 2/1980 | Stubben et al. | 273/DIG. 28 |
| 4,306,768 | 12/1981 | Egging | 273/437 |
| 4,568,080 | 2/1986 | Yokoi | 273/434 |
| 4,879,603 | 11/1989 | Berman | 358/242 |
| 4,971,312 | 11/1990 | Weinreich | 272/8 M |
| 4,973,951 | 11/1990 | Shigeta et al. | 340/717 |
| 5,190,286 | 3/1993 | Wantanabe et al. | 273/DIG. 28 |
| 5,221,083 | 6/1993 | Dote | 273/DIG. 28 |

FOREIGN PATENT DOCUMENTS 2306737 6/1989 Japan.
2212572 4/1990 Japan.

*Primary Examiner*—Jessica J. Harrison
*Attorney, Agent, or Firm*—Hecker & Harriman

[57] ABSTRACT

The invention is directed to an interactive video game whereby players sit opposite each other and view the game and each other through a semi-transparent image generated in real-time through the use of a first-surface reflection. The present invention uses opposing Heads-Up Displays (HUDs). Using opposing HUDs, an image can be apparently suspended between two players. The surface on which the image is displayed has sufficient transparency to allow each player to see the other player along with the image. Thus, the players can interact during play allowing for a more enhanced reward in the experience. The effect could be further enhanced by the use of stereo glasses and a stereo-pair of images on the display such that the players see 3-D images on the playing "surface." To further enhance the interactive experience, the virtual images are substantially coincident so that when one player looks up from the action in the game to see the opponent, the opponent's eyes are looking at roughly the same spot in space where the first player perceives the action to be. Thus, the present invention yields more direct communication between players, as well as an enhanced experience. The present invention yields additional applications such as where each player sees any number of images which correspond to the image of the "opponent," or "electronic painting" applications. Other games can take advantage of the fact that the image is superimposed on the opponent such as trying new facial features or clothing.

16 Claims, 13 Drawing Sheets

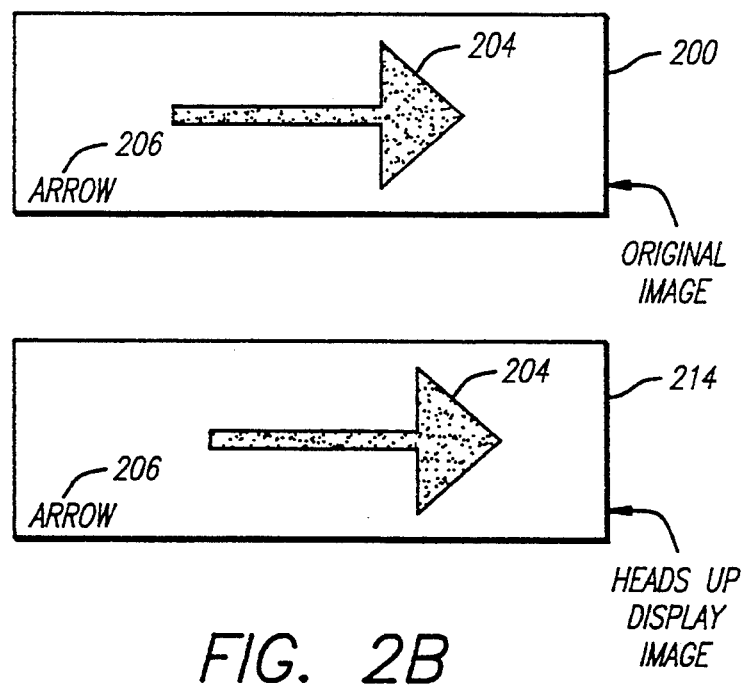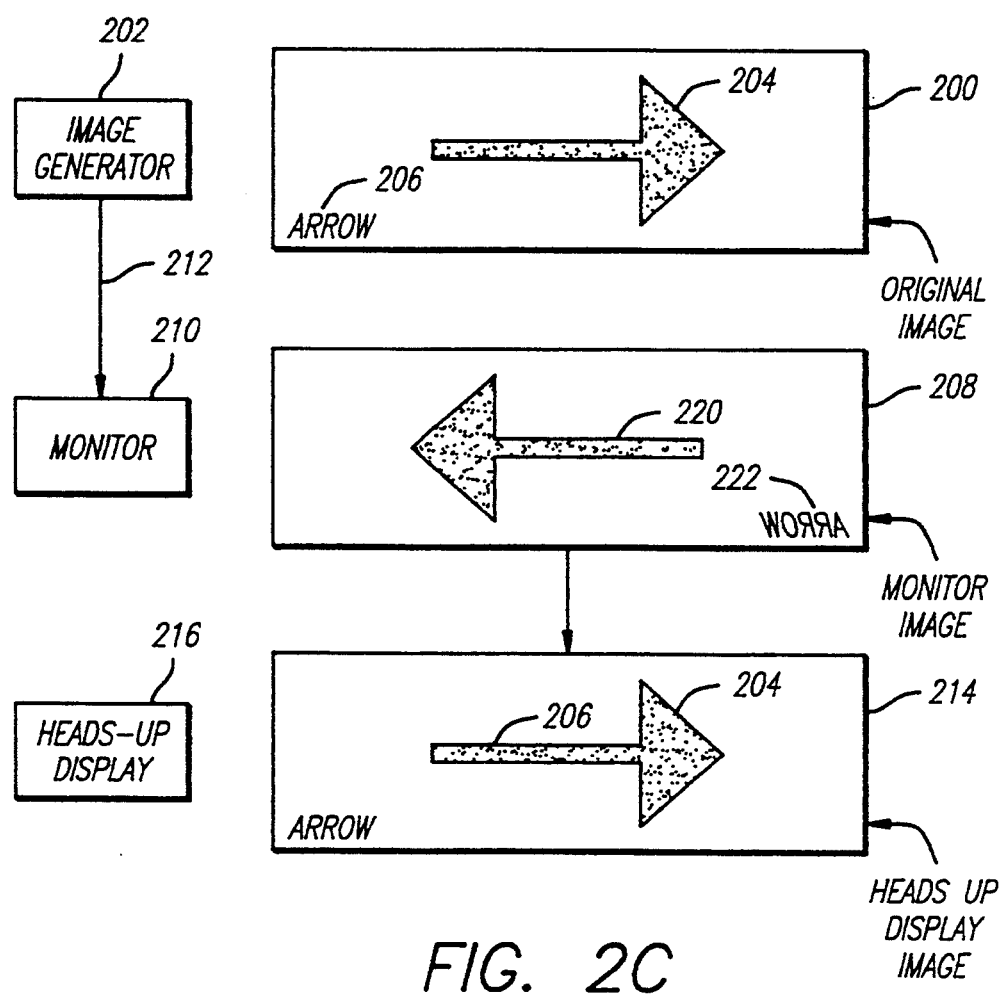
FIG. 2B
FIG. 2C

PLAYER A

PLAYER B

PLAYER A

PLAYER B

PLAYER A

PLAYER B

PLAYER A

PLAYER B

| RESULTING IMAGE | 3A REFLECTION REFLECTION A/B | 3B ORIGINAL ORIGINAL A/B | 3C REFLECTION ORIGINAL A/B | 3D MODIFIED ORIGINAL A/B |
|---|---|---|---|---|
| GRAPHICAL ELEMENTS | — — | ↻ ↻ | ↻ — | ↻ — |
| CONTROL ELEMENTS | ↻ ↻ | — — | — ↻ | — ↻ |
| TEXTUAL ELEMENTS | — — | ↻ ↻ | ↻ — | ↻ ↻ |

FIG. 7

METHOD AND APPARATUS FOR A VIRTUAL VIDEO GAME

BACKGROUND OF THE INVENTION

1. FIELD OF THE INVENTION

This invention relates to the field of virtual video games.

2. BACKGROUND ART

Many existing entertainment or amusement games rely on a conventional CRT display ("television" display). A player's point of view is trained on the television display. It is difficult for a player to divert attention to anything other than the display unless the diversion requires only a minimal perspective change. For example, a player would have difficulty remaining attentive to a video game display and making eye contact with another individual unless that individual's face was in close proximity to the video display.

Some games provide a multiple player mode. In multiple player mode, players either alternate "turns" in interacting with the game, or the players sit "side-by-side" and compete against each other, or cooperate against a common opponent. Whether the players are competing against one another or cooperating against a common opponent, it is not possible to see the expressions on each other's faces or determine the position of the other player's line of sight.

Because the players sit side-by-side when using prior art games, direct human interaction is unavailable. Thus, conventional video games are lacking in that players can't directly experience the reactions of their opponents or partners.

For example, Berman, U.S. Pat. No. 4,879,603, provides a way for adjacent users to view different images on a heads up display. The system uses circular polarization to project multiple images. By using appropriate filters (e.g. eyeglasses), each user sees only one of the projected images.

Ricker, U.S. Pat. No. 4,535,354, provides a method for projecting a pair of stereoscopic pictures that can be seen in three dimensions. Two projection images are projected onto a focusing screen. A beam splitter that acts as a reflector and transmitter is positioned between an observer and the focusing screen, or between the source images and the focusing screen. The system can be adapted for multiple users if they are located laterally to each other. There is no discussion of opposing views in Ricker.

Breslow, U.S. Pat. No. 4,710,873, describes a video game apparatus for capturing an image of a user, digitizing the image, and incorporating the image into the video game itself. A camera is included in the cabinetry of the video game and is used for image capture. The captured image is displayed on a prior art type video display.

Rebane, U.S. Pat. No. 3,857,022, provides a system including a positioning table that provides a signal representative of the position of a pen touched to a screen. An image can be projected onto the touch screen from behind, if the screen is translucent, or from the front, if the screen is opaque.

Yokoi, U.S. Pat. No. 4,589,659, is directed to a liquid crystal display that projects an image onto a mirror for viewing. The scheme permits an LCD display to be folded to a compact size and is suitable for portable video game use. The device is for viewing from one side only, or side by side viewing.

A heads up display system with holographic dispersion correction is described in Hartman, U.S. Pat. No. 4,613,200. The invention uses a grating device attached to a windshield and a second grating device under the dash. The device appears to be tuned to be optimized for a driver.

A stereoscopic display that provides alternating left and right images to create the illusion of depth is described in Pund, U.S. Pat. No. 4,649,425. The display is for viewing from one direction only.

A reflected display is described in Japan 1-47422 to Kuwayama. One party can simultaneously view display information and a party opposite a display screen. Unlike the present invention, the purpose of Kuwayama is to prevent the second party from viewing the displayed information. Such a scheme precludes "see through" viewing by two opposing viewers.

An illusion apparatus is described in Weinreich, U.S. Pat. No. 4,971,312. This scheme permits a human viewer to appear to interact with a display such as a television or monitor.

A double sided display of dot matrix LED or LCD display units is described in Shigeta, U.S. Pat. No. 4,973,951. The scheme is not related to video displays. The opposing displays are not see through, but rather opaque members are disposed between the displays.

A heads up display for an automobile or other moving vehicle is described in Roberts, U.S. Pat. No. 5,005,009. The invention is not related to video games.

Yamamura, JP-18588, describes a two direction heads up display device. Viewers on either side of a glass panel can see independent images with virtually no cross-talk between the images. There is no discussion of viewing both displayed images and the opposing viewer simultaneously, or matching the images to provide coincident "points of interest" of the projected images.

Harris, U.S. Pat. No. 5,115,228, describes a shuttered display panel that is viewable from the front and the back simultaneously. A see through display that can be viewed from both the front and back, e.g. a vacuum fluorescent display, is provided. When it is desired to show different images to the front and back users, an image is generated for the front viewer while the rear shutters are closed. A second image is generated for the rear viewer while the front shutters are closed. A video game that matches video display with user speech is described in Edelstein, U.S. Pat. No. 5,149,104.

A method for superimposition of projected and three dimensional objects is described in Lunde, U.S. Pat. No. 4,738,522. The system provides a method for using a beam splitter to combine the movement of an actor on a three dimensional set with a projected image. The beam splitter is provided in front of the three dimensional set. A recorded or live image is projected onto the beam splitter, forming a combined image. The projected image appears to interact with the three dimensional set pieces.

SUMMARY OF THE INVENTION

The invention is directed to an interactive video game whereby players sit opposite each other and view the game and each other through a semi-transparent image generated in real-time through the use of a first-surface reflection. The present invention uses opposing Heads-Up Displays (HUDs). A HUD is composed of a transparent, partially reflective material (e.g., glass, acrylic (Plexiglas), or polycarbonate (Lexan)). A HUD is placed in an angular position and serves as a "beam-splitter" such that the image is, in essence, superimposed on the objects behind the image. Many types of interactive experiences are possible with the present invention including video games and fashion and data visualizations.

Using opposing HUDs, a virtual image can be apparently suspended between two players. The HUD surface has sufficient transparency to allow each player to see the other player along with the image. Thus, the players can interact during play allowing for a more realistic and rewarding experience. The effect could be further enhanced by the use of stereo glasses and a stereo-pair of images on the display such that the players see 3-D images on the playing "surface."

To further enhance the interactive experience, the virtual images are substantially coincident so that when one player looks up from the action in the game to see the opponent, the opponent's eyes are looking at roughly the same spot in space where the first player perceives the action to be. The present invention provides the ability to rotate the images seen by the players such that the opposing images have the same orientation. Thus the lines of sight for each of the opposing players is the same.

The present invention yields more direct communication between players, as well as an enhanced experience. Other games can take advantage of the fact that the image is superimposed on the opponent such as trying new facial features or clothing.

BRIEF DESCRIPTION OF THE DRAWINGS

FIG. 2B illustrates the inversion capability of the present invention.

FIG. 2C illustrates a method of providing the correct orientation using hardware.

FIG. 7 illustrates a table that represents the four pairs of resulting images of FIGS. 3A-3D.

DETAILED DESCRIPTION OF THE INVENTION

A method and apparatus for a virtual video game is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The invention is directed to an interactive video game whereby players sit opposite each other and view the game and each other through a semi-transparent image. The image is generated in real-time through the use of a first-surface reflection. The present invention uses opposing Heads-Up Displays (HUDs). Many types of interactive experiences are possible with the present invention including video games and fashion and data visualizations.

The present invention allows an image to appear to be suspended between two players. The HUD has sufficient transparency to allow each player to see the other player along with the image. Thus, the players can interact during play allowing for a more competitive and realistic experience.

Figure 1A:
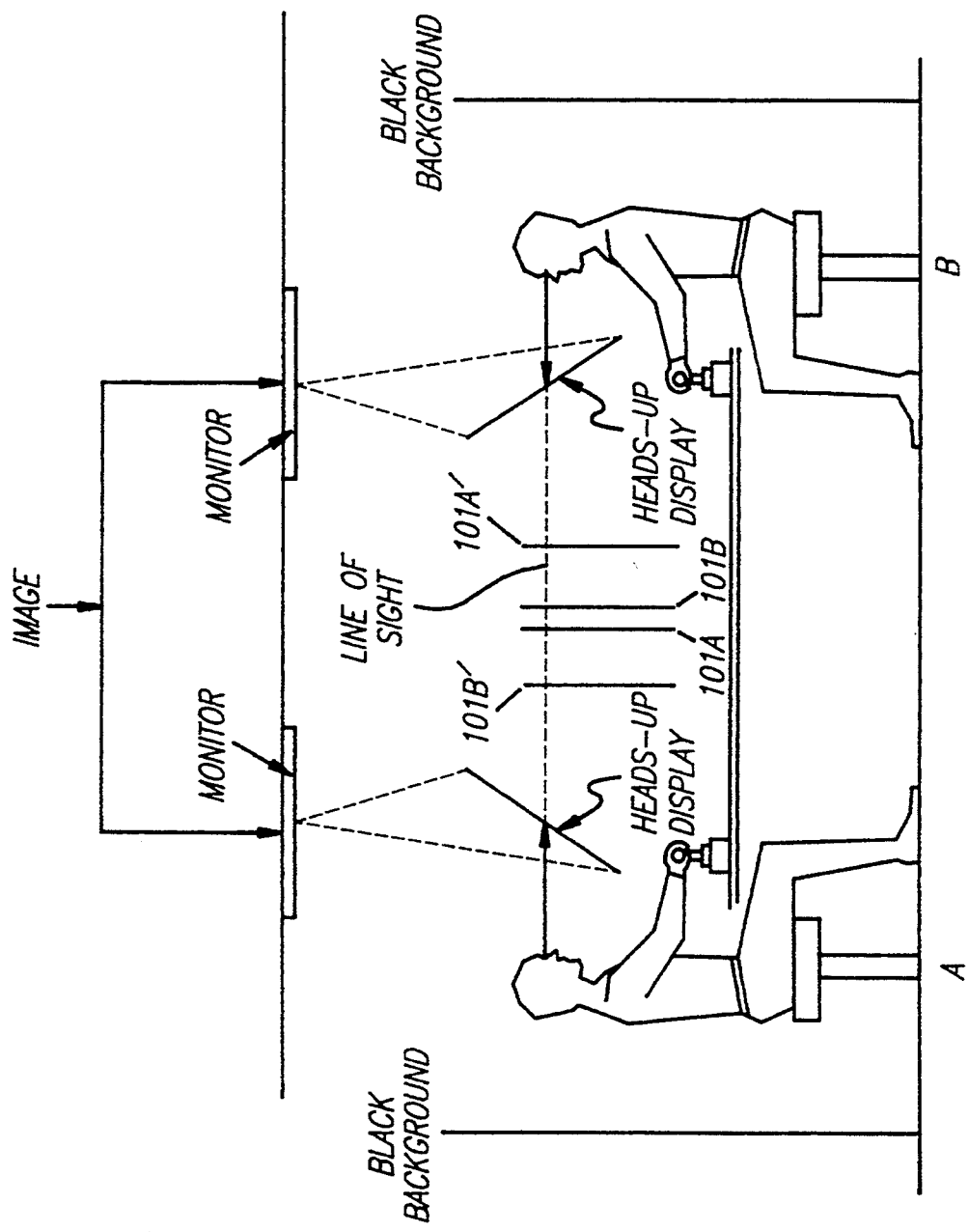
FIG. 1A illustrates a layout for the present invention using two players.

FIG. 1A illustrates a layout for the present invention using two players. It should be noted that even though only two players are illustrated, the present invention can be adapted to accommodate multiple players.

In FIG. 1A, the two players are sitting opposite each other and each is positioned in front of a HUD. A HUD is composed of a transparent, partially reflective material (e.g., glass, acrylic (Plexiglas), or polycarbonate (Lexan)). The HUD is placed in an angular position and serves as a "beam-splitter" such that the image and opposing player are composited into one. The image is, in essence, superimposed on the opponent.

The superimposition provided by the present invention yields more direct communication, as well as an enhanced experience. Superimposition creates additional applications such as where each player sees any number of images which correspond to the image of the "opponent," or "electronic painting" applications. Other games can take advantage of the fact that the image is superimposed on the opponent such as trying new facial features or clothing.

The effect of the present invention could be further enhanced by the use of stereo glasses and a stereo-pair of images on the display such that the players see 3-D images on the playing "surface."

Heads-Up Display Position

Referring to FIG. 1A, an original image is provided by an image source (e.g., video game or animated display). The original image is displayed on a monitor positioned overhead. Even though the monitor is shown above the HUD in FIG. 1A, it should be noted that a monitor can be positioned in any location (e.g., below the HUD) such that the image can be reflected off of the HUD).

To preserve the virtual video effect, the monitors may be obscured from the direct line of sight of the players. This can be accomplished by any number of devices such as micro-louvers, baffles or polarizers. Further, the image can be displayed on a monitor with a black background, so that the players don't perceive a complete, full-field virtual image.

To ensure that the virtual image does not appear faded or washed out, a dark backdrop of background can be placed behind each player. This will eliminate surrounding light that can fade the virtual image. The backdrop can be a dark shade such as black.

The image displayed on the monitor is a reflected from the HUD to a player. This display technique is used for each player. Thus, each player sees the game through their respective HUDs. Each HUD has an angular orientation relative to the "line-of-sight" of the viewer such that each player can view the displayed image and an opposing player with virtually no line of sight modification for either player.

Thus, each HUD provides a "beam-splitter" capability to allow a player to see two images composited into one. The two images are the dimensional (or "real") one of the "opponent" and the "virtual" one of the game display which is actually a first-surface reflection of the monitor overhead.

The virtual image appears to the observing player to be beyond the HUD. As illustrated in FIG. 1A, player A sees a virtual image 101A approximately midway between player A and player B. Player B sees virtual image 101B approximately midway between the two players. This is for purposes of example only. The images could be substantially coincident with each other, but that is not required. If desired, the virtual images could "appear" much closer to the viewing player or further away from the viewing player. In fact, the images could appear to "cross", as illustrated by virtual images 101A' and 101B'. It appears that virtual image 101A' is "behind" virtual image 101B'. Of course, the images do not actually cross, but rather the apparent spatial location of the image changes.

Further, the virtual image appears to the observing player to be suspended in space. To reinforce a player's notion that the image is suspended in space, setup pieces can be positioned within the plane of view. These setup pieces can extend from a surface (e.g., table) via a supporting element. The support structure of a setup piece will therefore be in contrast with the perceived lack of support for the HUD image. This will further support a player's notion that the HUD image is suspended in space.

Figure 1B:
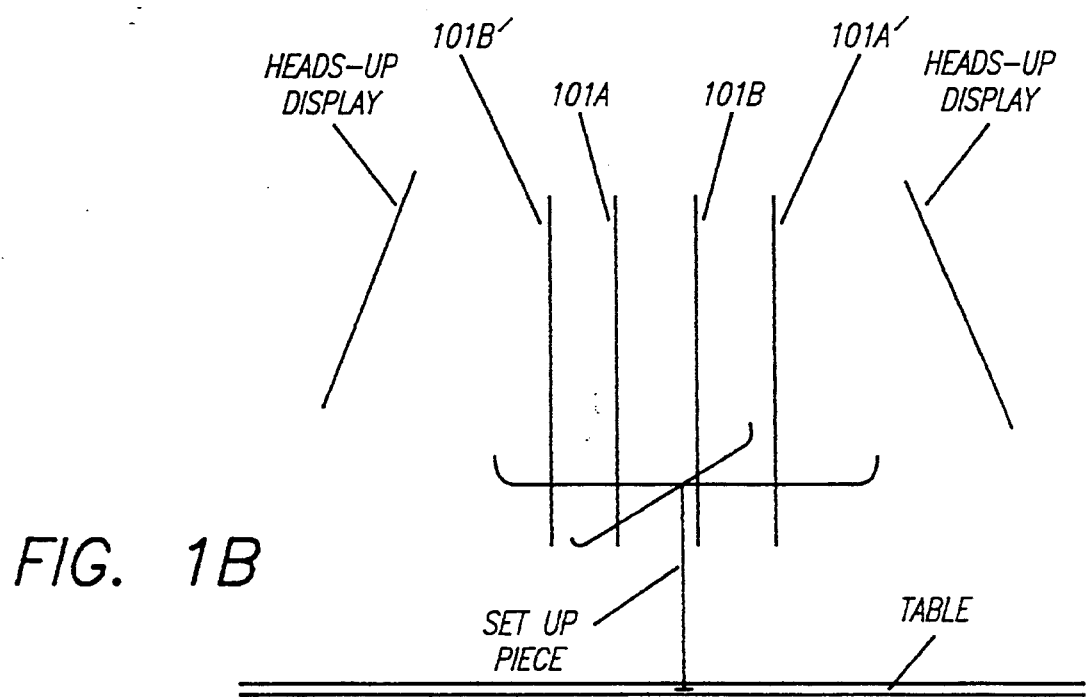
FIG. 1B illustrates a setup piece.

Figure 1B provides an example of a setup piece. The set up is comprised of a vertical piece affixed to the table and two horizontal pieces curved at both ends. This gives a sense of structure and depth. The set up piece can be seen while viewing the virtual images 101A, 101A', 101B, or 101B'. The vertical piece is attached to the table surface, and the horizontal pieces are attached from the vertical rod. Unlike the virtual images, the horizontal pieces are not suspended in space. This further reinforces a player's perception that the virtual images are suspended in space.

Figure 4:
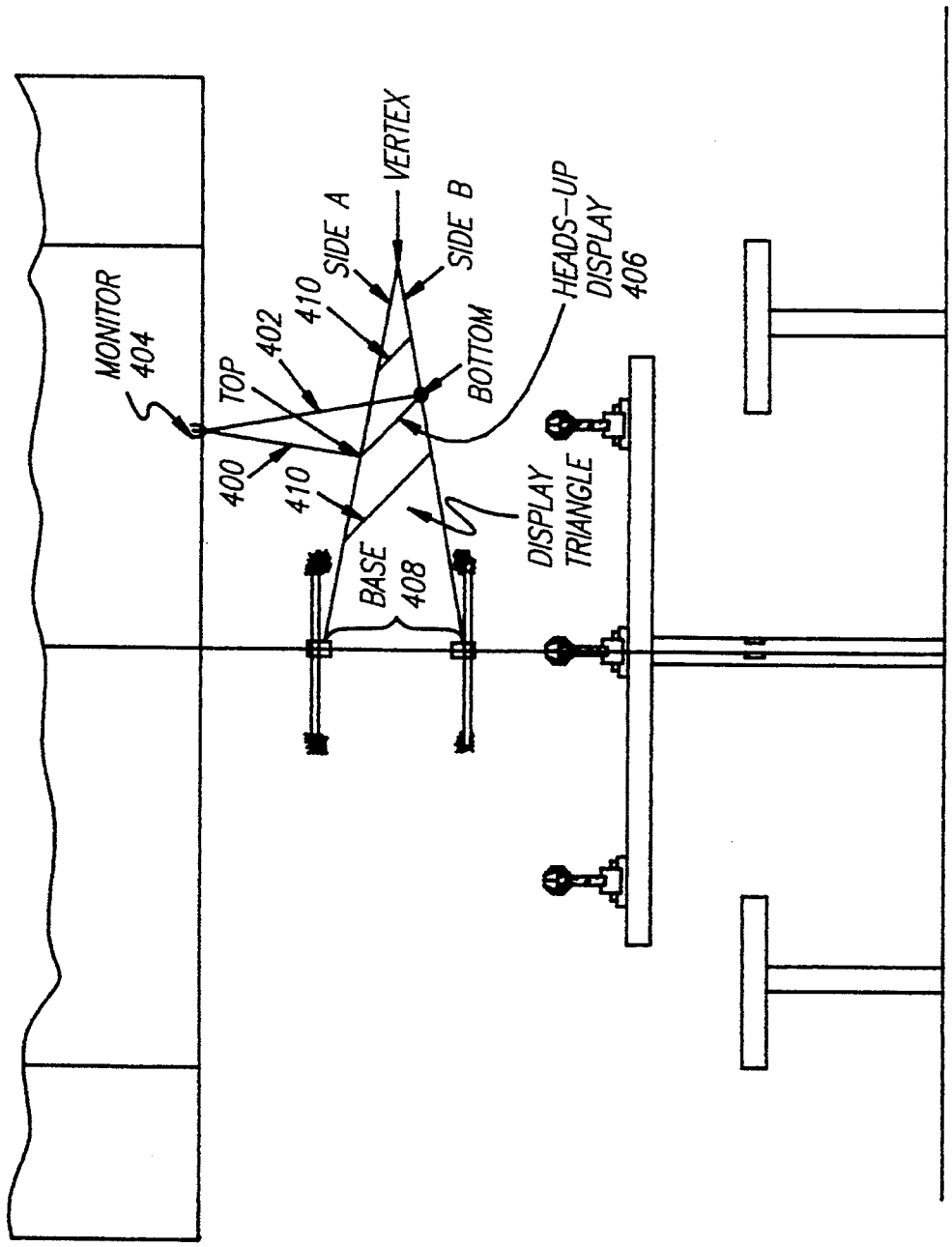
FIG. 4 illustrates a technique to optimize the dimensions of a HUD and the virtual video imaging of the present invention.
Figure 5A:
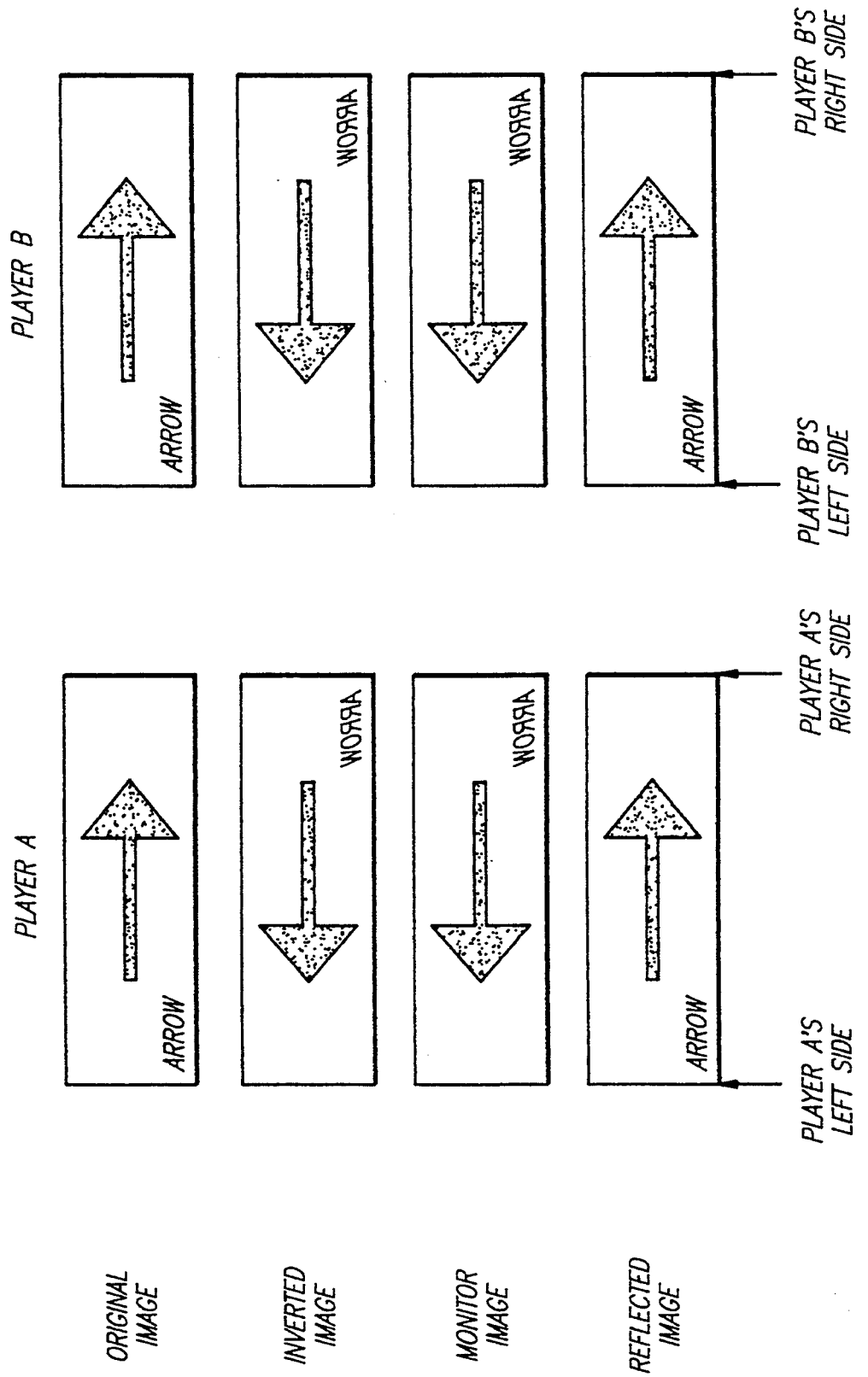
FIGS. 5A and 5B illustrate techniques for inverting the original image.
Figure 5B:
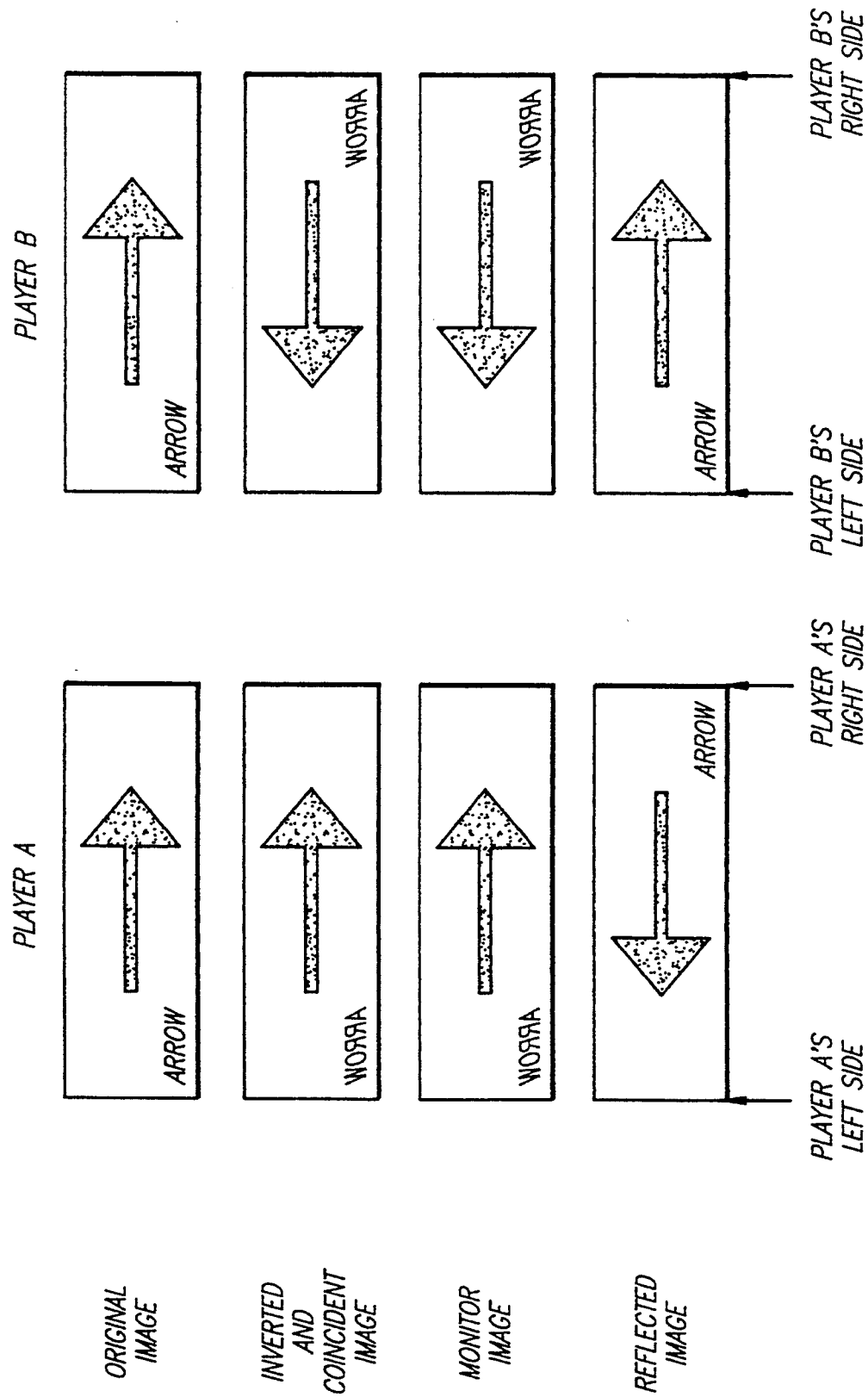

The dimensions of the HUD and location of the monitor can be determined based on the desired dimension of the virtual video image, the HUD angular orientation and the HUD's distance from the player. FIG. 4 illustrates a technique that optimizes the dimensions of a HUD and location of the monitor thereby optimizing the virtual video effect of the present invention.

The Display Triangle establishes the framework for determining the HUD's dimensions and monitor location. Base 408 of the display triangle is equal to the length of the desired virtual video image. The vertex of the display triangle represents the position of a player's point of view relative to base 408. The sides of the display triangle (i.e., Side A and Side B) are formed by connecting each end of the base to the vertex.

HUD 406 is placed somewhere within the display triangle such that Top (i.e., upper edge of the HUD) is positioned somewhere along or outside Side A and Bottom (i.e., bottom edge of the HUD) is positioned somewhere along or outside Side B. Top and Bottom are positioned along Side A and Side B respectively such that the vector formed by Top and Bottom represents the HUD with an angular positioning of forty-five degrees (45°) relative to the horizontal plane (e.g., plane of monitor). Monitor 404 is located above HUD 406 by projecting Top via Line 400 toward Monitor 404, and projecting Bottom via Line 402 toward Monitor 404.

Alternate HUD locations 410 illustrate the dimensional changes to the HUD as the angular orientation remains constant and Top and Bottom points are varied along Side A and Side B, respectively. As can be seen, the length of the HUD will increase as the HUD's position moves closer to the base of the Display Triangle (i.e., Base 408), or decrease as it moves away from Base 408.

Thus, given the desired dimension of the virtual video image (i.e., base 408), the distance of the player from the virtual image (i.e., vertex), a Display Triangle is identified. The angular orientation of the HUD (i.e., 45°) dictates the relative positions of Top and Bottom. A HUD is drawn within the Display Triangle at a 45° angle, and Monitor 404 is positioned above the HUD's position. This provides the optimal virtual video image for the present invention.

Second Surface Reflection

Figure 6A:
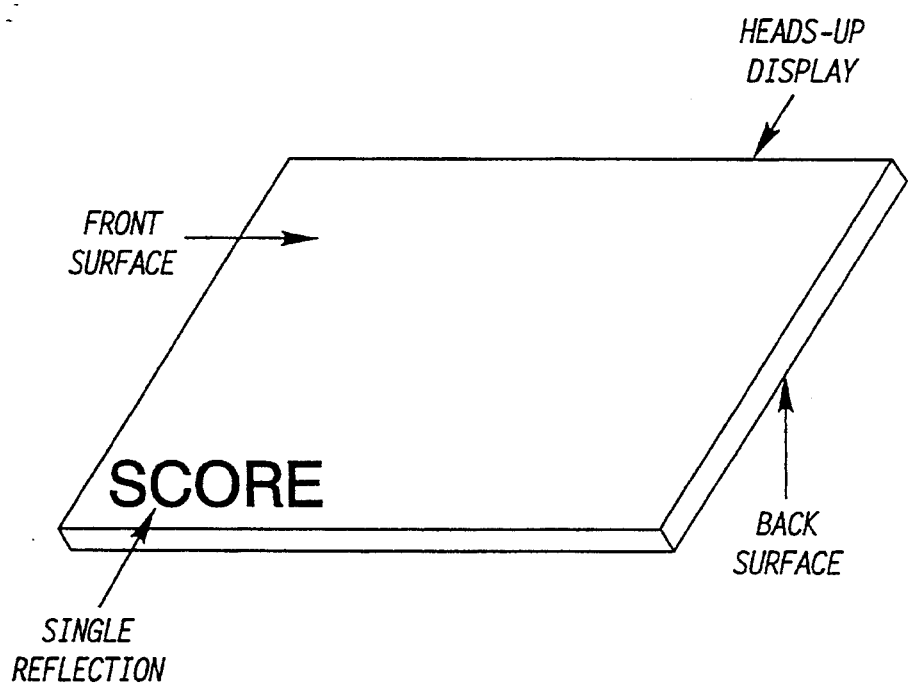
FIGS. 6A and 6B relate to the shadow effect of first and second surface reflections.
Figure 6B:
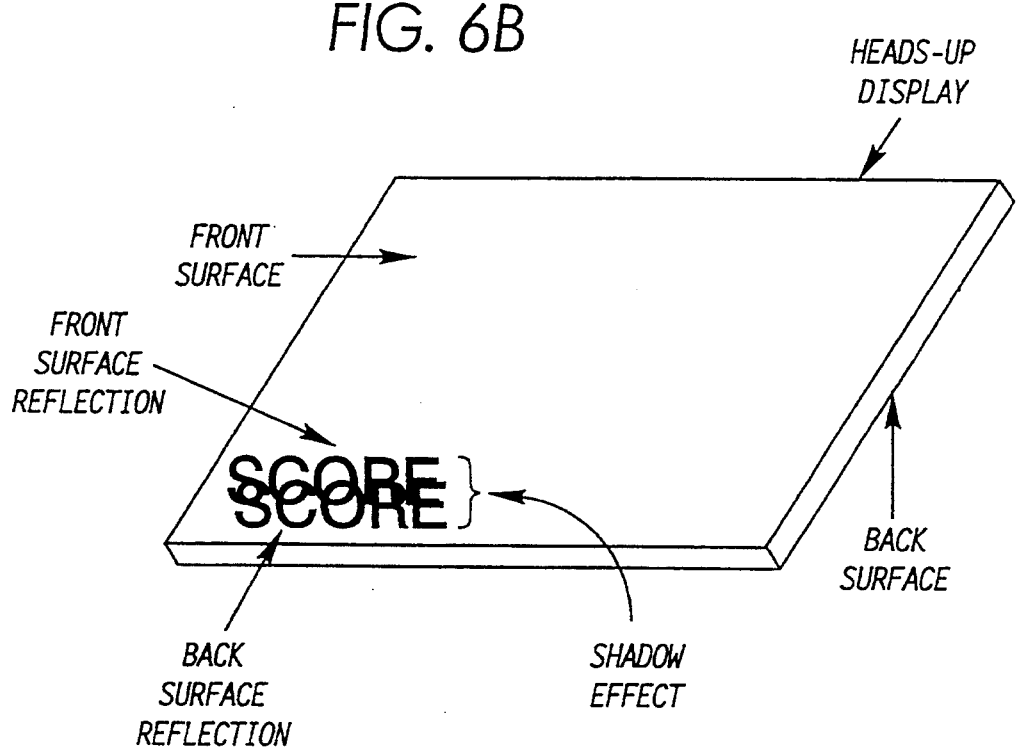

Preferably, a reflected image should appear as illustrated in FIG. 6A. However, reflective surfaces (e.g., HUD) can produce a shadow effect that is caused by the reflection from a first surface (e.g., front side) and a second surface (e.g., back side). FIG. 6B illustrates the shadow effect caused by the reflections from the front and back surfaces. The present invention provides the ability to minimize the shadow effect by placing a degree of coating on the front and back surfaces. This anti-reflection feature of the present invention is optional, and augments the virtual video imaging provided by the present invention. However, the other features of the present invention may be used in the absence of the anti-reflection feature.

In the preferred embodiment of the present invention, a coating with approximately an 18-20% reflectivity is placed on the front surface of the HUD and a coating with approximately 1% reflectivity is used for the back surface of the HUD. This virtually eliminates the shadowing effect in FIG. 6B and results in the reflection illustrated in FIG. 6A.

Reflection Process

Referring to FIG. 1A, the HUD reflects the image displayed on the Monitor and the image's reflection is viewed by a player. Therefore, the image reflected onto the HUD and viewed by a player is the inverse (i.e., the left and right of the image displayed on the monitor. If the monitor's image has the same orientation as the original image (i.e., original image produced by an image generator), the image viewed by a player is the inverse of the original image. This process of reflection impacts the graphical, textual, and control elements of the present invention.

Figure 2A:
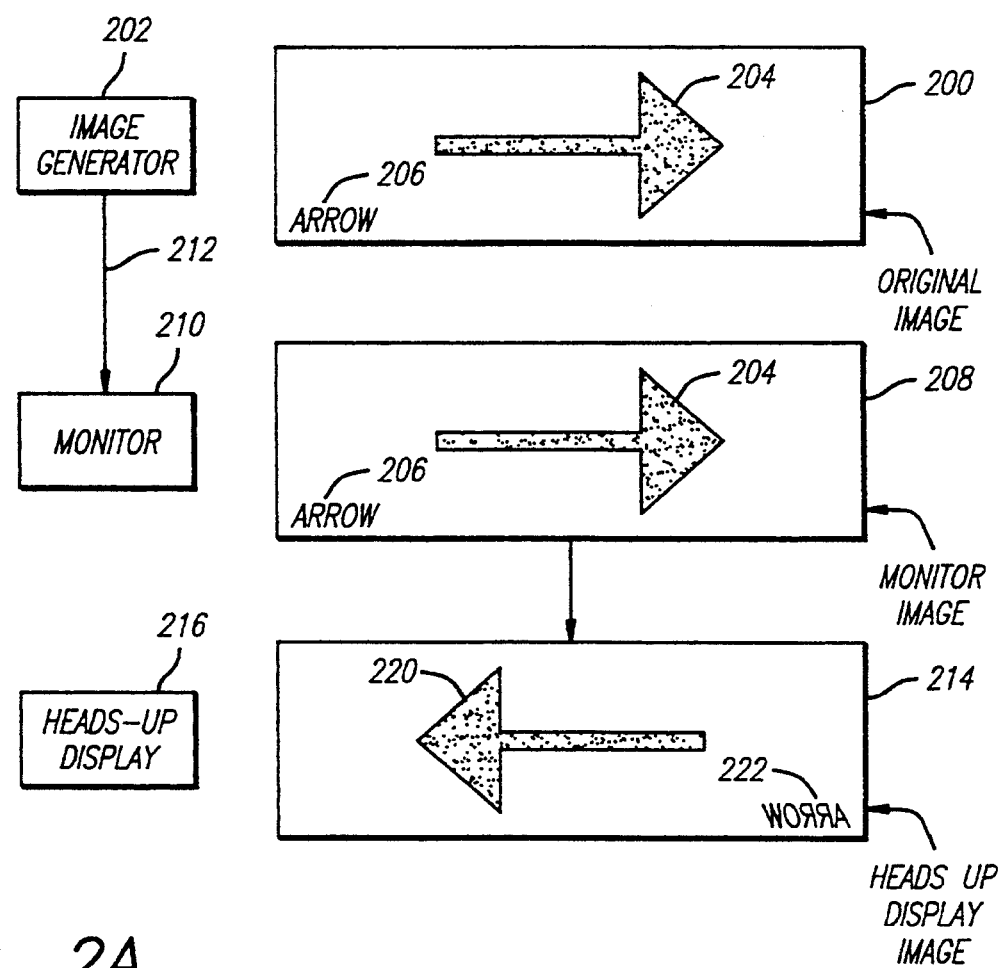
FIG. 2A illustrates an image at each stage of progression from its generation to its display on the HUD for viewing by a player.

To further illustrate the reflection process, FIG. 2A depicts an image at each stage of progression from its generation to the image's reflection from the HUD for review by a player. Original image 200 is provided by image generator 202. The image can be comprised of both graphic and textual symmetrical or asymmetrical components. FIG. 2A illustrates an asymmetrical graphical component (i.e. arrow) 204, and text 206 (i.e., "ARROW"). Arrow 204 points from left to right and text 206 appears in the lower left corner of the image.

Original image 200 is transmitted to Monitor 210 via line 212. Monitor Image 208, contains arrow 204 and text 206 and is identical to Original Image 200. HUD reflects the image displayed on Monitor 210. HUD Image 214 is the image of Original Image 200 seen by a player. As can be seen, HUD Image 214 is the inverse of Original Image 200. HUD Image 214 is a reflection of Monitor Image 208. Thus, arrow 220 is the inverse of arrow 204 and text 222 is the inverse of text 204. The inverted text 222 appears in the lower right corner of the HUD, and the inverted arrow 220 points from right to left.

Since the end result of the reflection process is the inverse of the original, the reflection process effects the control elements of the present invention. Referring to FIG. 2A, the HUD Image is an inverse of the Original Image. Someone viewing the HUD Image will believe that a movement from arrow head to the base of the arrow head is a movement from left to right. However, such a movement is actually a movement from right to left in the original image. Therefore, when the HUD Image is the inverse of the original image, the control elements of the present invention must compensate for this incongruity such as inverting the signals received from the joystick.

Reflection Compensation

The compensation capabilities provided by the present invention are based on the resulting image seen by a player. For example, one embodiment of the present invention provides the ability to invert the original image such that the original image and the HUD image are identical. FIG. 2B illustrates this inversion process. The graphic and textual components in Original Image 200 and HUD Image 214 have the same orientation. Thus, the HUD image viewed by a player has the same orientation as the original image provided by the image generator (e.g., video game). That is, the player will see arrow 204 and text 206. The following is a discussion of various images seen by two players (i.e., A and B) and possible compensation techniques that may be needed for each.

The table of FIG. 7 illustrates four possible pairs of resulting images that can be generated using the present invention, depending on operations performed on the graphic elements of the original image, on the text of the original image, and on the control elements. Columns 3A-3D correspond to the examples of FIGS. 3A-3D respectively. The entries in the row titled "resulting image" indicate the image seen by each player A and B. For example, the entry in the row titled "resulting image" in column 3A is "reflection/reflection". This means that each player sees a reflection of the original image.

The entries in the row titled "graphical elements" indicate operations performed on the graphical portion of the original image. A straight line indicates that no operation is performed on the graphical portion. A pair of arrows indicates that an inverting operation is performed. Similarly, for the rows entitled "control elements" and "textural elements", a straight line means that no operation is performed and arrows indicate an inverting operation.

Each of the configurations of columns 3A-3D are described below in conjunction with FIGS. 3A-3D respectively.

Reflection/Reflection

Figure 3A:
FIGS. 3A-3D illustrate four different pairs of resulting images using the present invention.
Figure 3A:
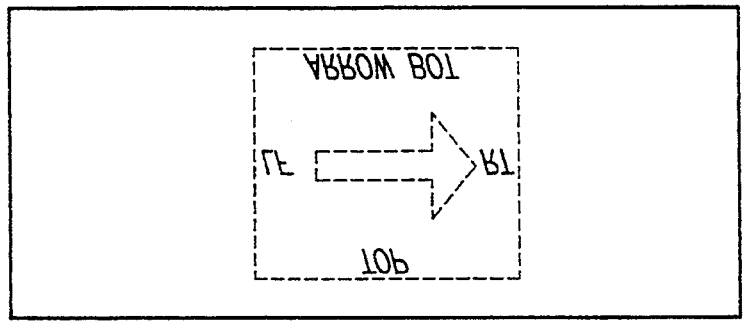
Figure 3A:
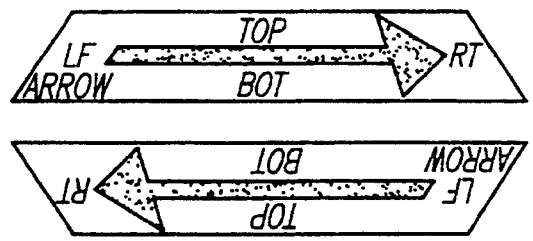
Figure 3A:
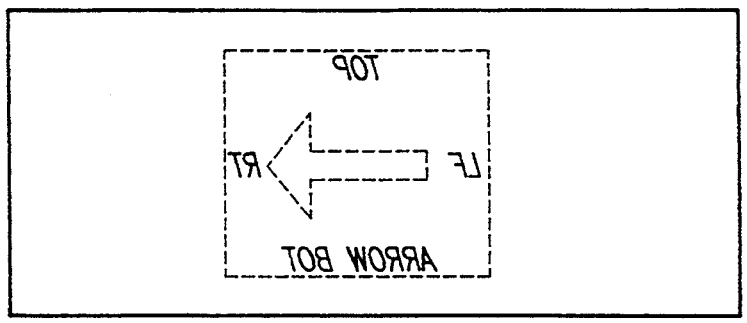
Figure 3A:
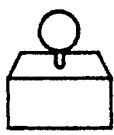

FIG. 3A provides an illustration of player A and B's resulting images where both player's resulting image is a reflection of the original image. Player B's perspective is illustrated by viewing the Figure from the bottom of the figure toward the top of the figure while player A's perspective is from the top down. Looking at the figure from Player B's perspective, player B's resulting image is a reflection of player B's Monitor Image. The arrow in the monitor image is pointing from left to right, however the arrow in the resulting image is pointing from the players' right to the players' left. Similarly, the textual components in the resulting image are the inverse of the text in the monitor image.

Player A's perspective can be viewed from the top of the figure looking toward the bottom. Like player B, player A views a resulting image that is the inverse of the A's monitor image. Since the monitor images are the same as the original image, the resulting images are the inverse of the original image. Thus, the textual elements viewed by each player are in inverse order.

Further, the graphical elements are in the resulting images are the inverse of the original in, age. For example, when player B views the arrow in the resulting image from the left to right, B will be scanning the arrow from the arrow's head to its base. However, as can be seen in B's monitor image, a scan of monitor image (i.e., as well as the original image) from left to right scans the arrow's base to its head. Thus, player B's directional orientation is the inverse of the original image's directional orientation Therefore, when B is pointing to the right-hand side of the resulting image, B will actually be pointing to the left-hand side of the original image.

Original/Original

FIG. 3A illustrates an example where the textual components in both of the resulting images is inverted. Thus, the text is difficult to read.

Figure 3B:
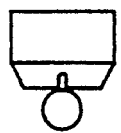
Figure 3B:
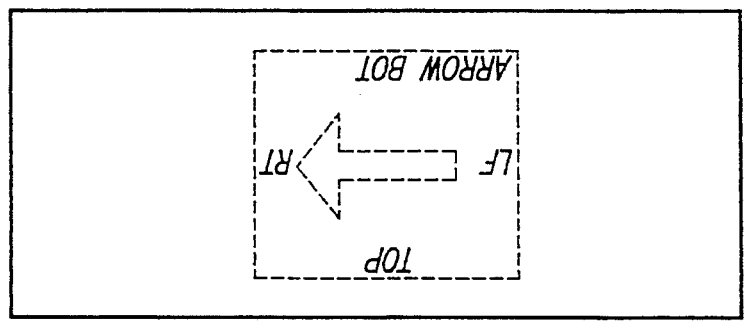
Figure 3B:
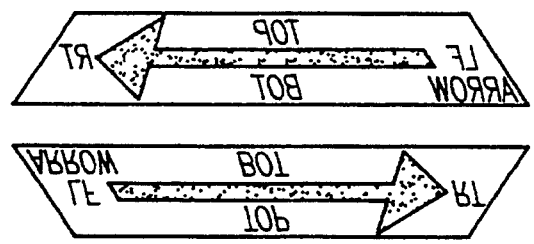
Figure 3B:
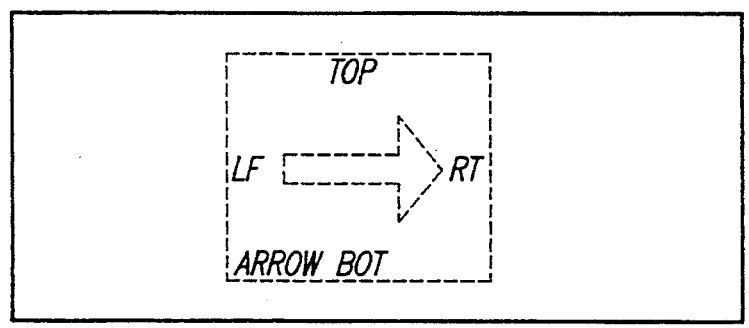
Figure 3B:
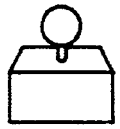

FIG. 3B provides an illustration of player A and B's resulting images where both players' resulting images have the same orientation as the original image (i.e., the monitor images are the inverse of the original image and the resulting images are the inverse of the monitor image). As in FIG. 3A, Player B's perspective is illustrated by viewing the FIG. from the bottom up while player A's perspective is from the top down.

Because the resulting images are the same as the original image, the graphical and textual elements in the resulting images have the same orientation has in the original image, and the textual components can be read from left to right. Further, the players' graphical components have the same orientation as in the original image.

Reflection/Original

Figure 3C:
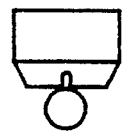
Figure 3C:
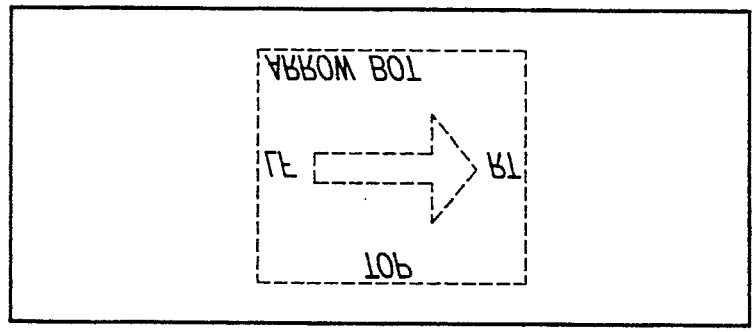
Figure 3C:
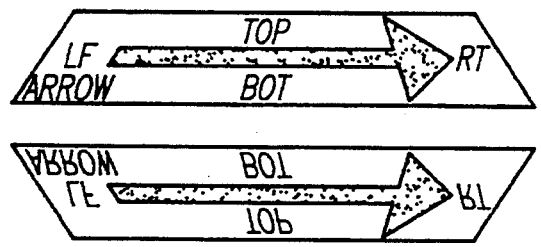
Figure 3C:
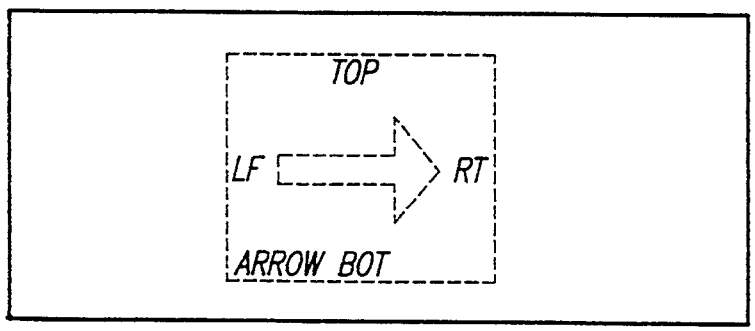
Figure 3C:
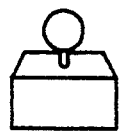

FIG. 3C provides an illustration of player A and B's resulting images where one players' resulting image (player A) is a reflection of the original image and the other players' (player B) resulting image is a reflection of the inverse of the original image. Player B's perspective is illustrated by viewing the Figure from the bottom of the sheet containing the Figure toward the top of the sheet. Player A's perspective is illustrated by viewing the Figure from the top of the sheet containing the Figure toward the bottom of the sheet.

Looking at the Figure from Player B's perspective, player B's resulting image is a reflection of player B's Monitor Image, an inverse of the original image. The arrow in the monitor image is pointing from right to left, however the arrow in the resulting image is pointing from the players' left to the players' right. The textual components in the monitor image are inverted, but appear as normal readable text in the resulting image seen by Player B.

Player A views a resulting image that is the inverse of the A's monitor image. Since the monitor image is the same as the original image, the resulting image is the inverse of the original image. Thus, the textual elements viewed by player A are in inverse order. However, as can be seen in FIG. 3C, the graphic images are coincident. That is, when the players are looking at the same action point (e.g. the point of the arrow), each player is looking at substantially the same location.

Modified Original/Original

FIGS. 3A and 3B illustrate a situation where each player will be viewing the graphical elements of their respective images from a different orientation. Referring to FIG. 3B, when player B looks at the head of the arrow in B's resulting image, B's line of sight will be directed toward the left side of the B's resulting image and the right side of A's resulting image (i.e., from A's perspective). However, when player A looks at the head of the arrow in A's resulting image, A's line of sight will be directed toward the left side of A's resulting image and the right side of B's resulting image (i.e., from B's perspective). The present invention can be used in this manner, however, when play is concentrated on one side of the resulting images, each player will appear to the other to be looking at the wrong side of the image.

Figure 3D:
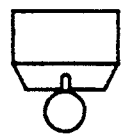
Figure 3D:
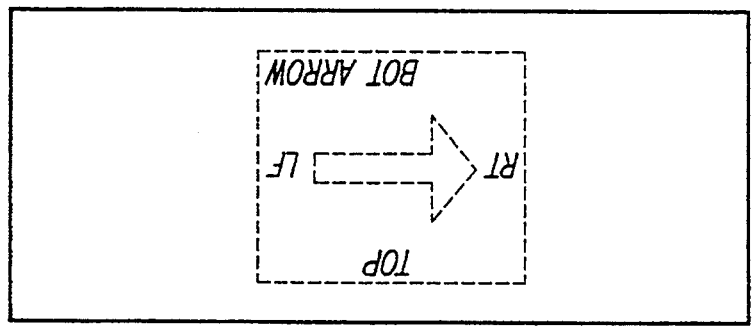
Figure 3D:
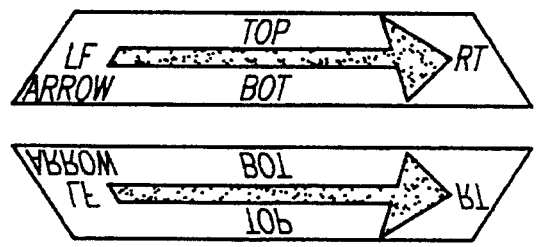
Figure 3D:
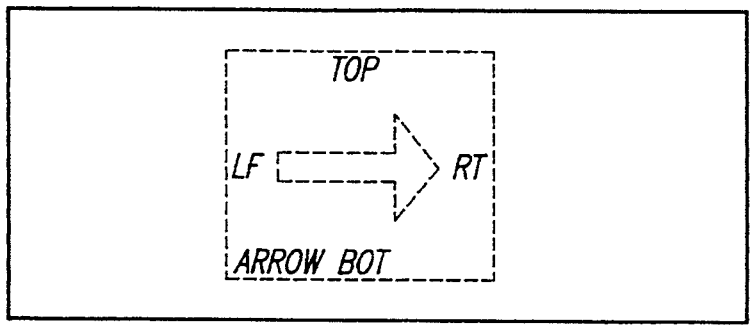
Figure 3D:
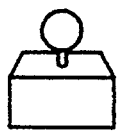

FIG. 3D provides an illustration of player A and B's resulting images where player B's resulting image is the same as the original image, (i.e., B's monitor image is the inverse of the original image and B's resulting image is the inverse of the monitor image). However, the graphical and textual components of the original image are treated differently to yield player A's resulting image.

The graphical components (i.e., arrow in FIGS. 3A–D) in the original image are not inverted before they are viewed by player A. Thus, A's resulting image contains graphical components that are the inverse of the original image. However, the textual components in the original image are inverted prior to appearing on player A's monitor image. Thus, A's resulting image contains text that has the same orientation as in the original image, and can be read from left to right.

The operations performed on the two monitor images results in resulting images that provide coincident lines of sight. It is as though one player is viewing the virtual image from the opposite side from the side being viewed by the other player. This is best illustrated by folding the figure in half horizontally. By doing so, it can be seen that the graphical components (e.g., the tips of the arrowheads) and the textual components in both of the resulting images are apparently coincident. Thus, both players will appear to the other to be looking at the same area within the virtual image.

Hardware Image Manipulation

The inversion can be performed using either hardware or software alternatives. FIG. 2C illustrates a method of providing the correct orientation using hardware. The Image Generator 202 provides image 200 with arrow 204 and text 206. Image 200 is transmitted to Monitor 210 via communication line 212. The polarity of the coils in Monitor 210 are reversed to perform a backwards scan. A backwards scan causes Monitor 210 to scan the image provided by Image Generator 202 in reverse order. Thus, Original Image 200 is transmitted to Monitor 210 and inverted as it is output on Monitor 210. Monitor 210 inverts Original Image 200 to produce Monitor Image 208 comprised of arrow 220 and text 222 (i.e., the inverse of arrow 204 and text 206, respectively). HUD 216 reflects Monitor Image 208 to produce HUD Image 214 (i.e., a reflection of Monitor Image 208). Since HUD Image 214 is a reflection of Monitor Image 208 and Monitor Image 208 is the inverse of Original Image 200, HUD Image 214 is the inverse of Monitor Image 214 and has the same orientation as Original Image. Thus, HUD Image 214 is comprised of arrow 204 and text 206.

Software Image Manipulation

Figure 2D:
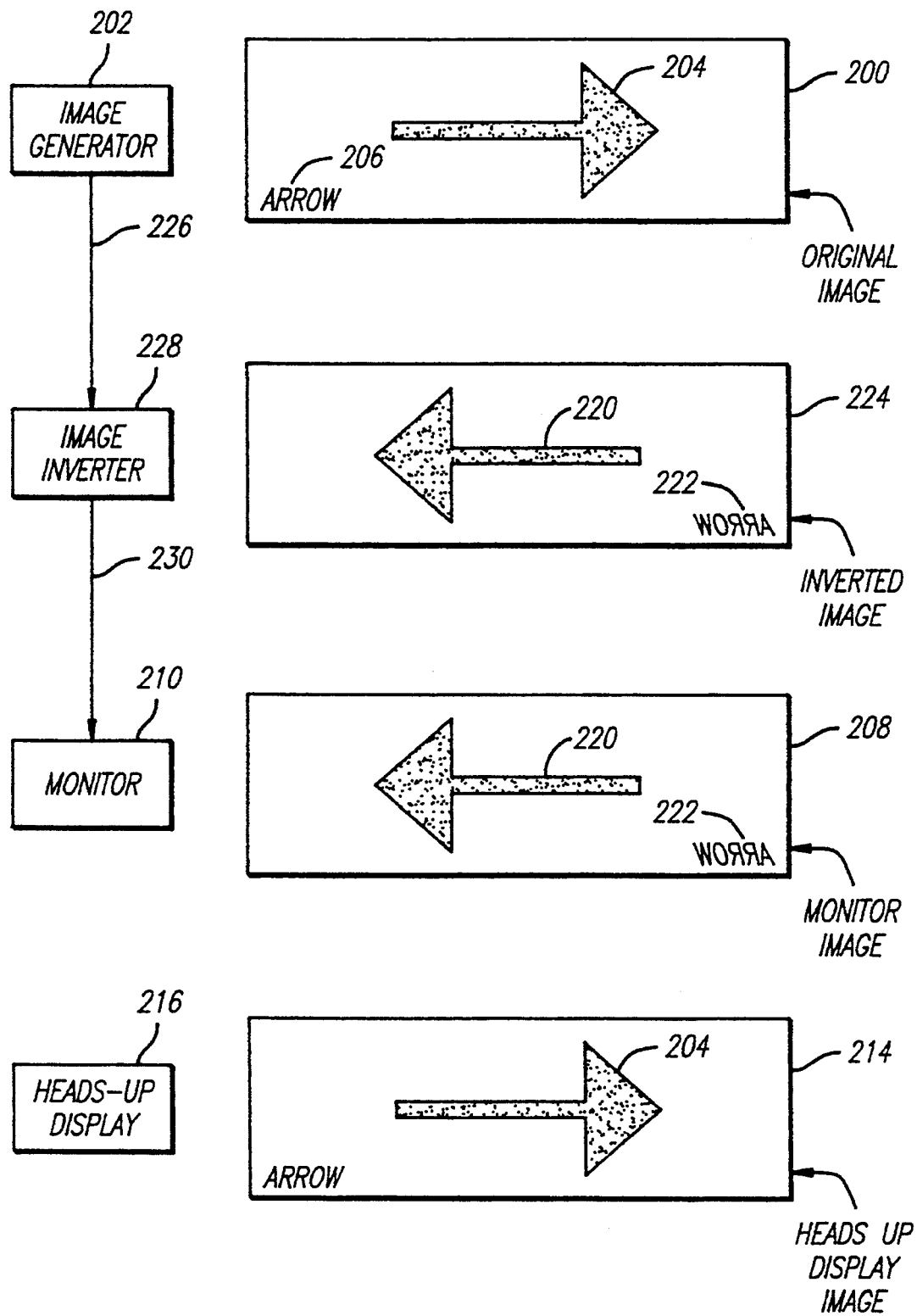
FIG. 2D illustrates the process for inverting an original image using software.

The present invention can also be implemented such that the inversion process is manipulated using software (e.g., digital video editor or computer). FIG. 2D illustrates the process for inverting Original Image 200 using software. Image Generator 202 provides Image 200 comprised of arrow 204 and text 206. Original Image 200 is transmitted to Image Inverter 228 via 226. Image Inverter 228 inverts Original Image 200 to produce Inverted Image 224.

Inverted Image 224 is comprised of arrow 220 and text 222 (i.e., the inverse of arrow 204 and text 206). Inverted Image 224 is transmitted to Monitor 210 via 230 and is output as Monitor Image 208. Monitor Image 208 and Inverted Image 224 are identical. HUD 216 reflects Monitor Image 208 to produce HUD Image 214 (i.e., a reflection of Monitor Image 208). Since HUD Image 214 is a reflection of Monitor Image 208 and Monitor Image 208 is the inverse of Original Image 200, HUD Image 214 is the inverse of Monitor Image 214 and has the same orientation as Original Image 200. Thus, HUD Image 214 is comprised of arrow 204 and text 206.

Character Inversion

FIG. 3D illustrates that text components can be positioned such that the position of opposing, like components are coincident (i.e., positional coincidence). However, the letters within like text components (e.g., "ARROW" in FIG. 3D) are not coincident. Thus, the letter "A" in the "ARROW" text component of player A's resulting image is not coincident with the letter "A" in the same text component of player B's resulting image (i.e., order coincidence).

Complete coincidence (positional and order coincidence) results in the letters of one of the "ARROW" components being in reverse order, and results in the text being difficult to read. To achieve complete coincidence for both the text and the graphics components, the text components of an image can be addressed independent of the graphic components. It can be seen, however, that complete coincidence of text components will effect the readability of the text component for one of the players.

A determination of whether to make a textual component absolutely coincident in opposing images and to sacrifice the readability of the text can be dependent on the purpose of the text. For example, text that is considered to be supplemental or informational (e.g., score tally) does not have to be completely coincident. In such an instance, positional coincidence will be sufficient to maintain the virtual video characteristics of the present invention. Information or supplemental text is not considered to be part of the action and, therefore, the readability of such text is more important than absolute coincidence.

A small percentage of textual components may be considered integral to the perceived action. A still smaller percentage of text components will be of such dimension that the coincident line of sight of the present invention may be impacted. In this instance, both positional and order coincidence may be needed. That is, integral text that is of such a dimension to affect the line of sight can be displayed in reverse order such that each component of the text is aligned with the same component in the opposing image. Using a software inversion technique, such text can be individually addressed to achieve order coincidence. Thus, complete coincident will be achieved and the line of sight maintained.

Thus, a method and apparatus for a virtual video game whereby players sit opposite each other and view the game and each other through a semi-transparent image generated in real-time through the use of a first-surface reflection has been provided.

We claim:

1. A display comprising:
   control means for controlling input and effecting visual output;
   a first display means for displaying a first image of said visual output;
   a second display means for displaying a second image of said visual output such that said second image is inverted;
   a first reflecting means for reflecting said image from said first display means toward a first viewer; and
   a second reflecting means for reflecting said image toward a second display means toward a second viewer, said first and second viewers positioned opposed to one another.

2. The apparatus of claim 1 wherein said second reflecting means is positioned opposite said first reflecting means and said first reflecting means is in the field of view of said second viewer and said second reflecting means is in the field of view of said first viewer.

3. The apparatus of claim 2 wherein said graphical component of said second image is reversed and said textual component of said first and second images is reversed.

4. The apparatus of claim 2 wherein said graphical component of said first image is reversed and said textual component of said first and second images is reversed.

5. The apparatus of claim 1 wherein said image is composed of graphical and textual components.

6. An apparatus for providing coincident lines of sight in opposing views comprising:
   control means for controlling input and generating visual output with a plurality of graphic and text components;
   a first inverting means for generating a first inverted image of said visual output;
   a first display means for displaying a first image of said first inverted image;
   a second inverting means for generating a second inverted image of said visual output;
   a second display means for displaying said second inverted image of said visual output;
   a first reflecting means for reflecting said first inverted image from said first display means toward a first viewer; and
   a second reflecting means for reflecting said second inverted image toward a second viewer, said first and second viewers positioned opposed to one another.

7. An apparatus of claim 6 such that said first inversion means inverts said text and graphic components of said visual output and said second inversion means inverts said text components of said visual output.

8. An apparatus of claim 6 such that said second inversion means inverts said text and graphic components of said visual output and said first inversion means inverts said text components of said visual output.

9. A display comprising:
   control means for controlling input and effecting visual output;
   a first display means for displaying a first image of said visual output;
   a second display means for displaying a second image of said visual output such that said second image is inverted;
   a first reflecting means for reflecting said image from said first display means toward a first viewer; and
   a second reflecting means for reflecting said image from said second display means toward a second viewer;
   wherein said first viewer receives a first composite image comprising an opposing image of said second viewer and said reflected image from said first reflecting means, said second viewer receiving a second composite image comprising an opposing image of said first viewer and said reflected image from said second reflecting means.

10. The apparatus of claim 9 wherein said second reflecting means is positioned opposite said first reflecting means and said first reflecting means is in the field of view of said second viewer and said second reflecting means is in the field of view of said first viewer.

11. The apparatus of claim 10 wherein said graphical component of said second image is reversed and said textual component of said first and second images is reversed.

12. The apparatus of claim 10 wherein said graphical component of said first image is reversed and said textual component of said first and second images is reversed.

13. The apparatus of claim 9 wherein said image is composed of graphical and textual components.

14. An apparatus for providing coincident lines of sight in opposing views comprising:
   control means for controlling input and generating visual output with a plurality of graphic and text components;
   a first inverting means for generating a first inverted image of said visual output;
   a first display means for displaying a first image of said first inverted image;
   a second inverting means for generating a second inverted image of said visual output;
   a second display means for displaying said second inverted image of said visual output;
   a first reflecting means for reflecting said first inverted image from said first display means toward a first viewer; and
   a second reflecting means for reflecting said second inverted image toward a second viewer;
   wherein said first viewer receives a first composite image comprising an opposing image of said second viewer and said reflected image from said first reflecting means, said second viewer receiving a second composite image comprising an opposing image of said first viewer and said reflected image from said second reflecting means.

15. An apparatus of claim 14 such that said first inversion means inverts said text and graphic components of said visual output and said second inversion means inverts said text components of said visual output.

16. An apparatus of claim 14 such that said second inversion means inverts said text and graphic components of said visual output and said first inversion means inverts said text components of said visual output.

* * * * *